United States Patent [19]

Hashimoto et al.

[11] Patent Number: 4,846,490
[45] Date of Patent: Jul. 11, 1989

[54] CONSTRUCTION OF A BICYCLE FRAME FOR JOINING CHAINSTAYS WITH A BOTTOM BRACKET SHELL

[76] Inventors: Masaki Hashimoto, c/o Kansai-kohjo of Araya Kogyo Kabushikikaisha; 1-1-59-Takeshima, Nishiyodogawa-ku, Osaka-shi, Osaka-fu; Noboru Yamaguchi, Settsu-shi, Osaka-fu, both of Japan

[21] Appl. No.: 248,800

[22] Filed: Sep. 26, 1988

[30] Foreign Application Priority Data

Nov. 11, 1987 [JP] Japan .............. 62-171427[U]

[51] Int. Cl.[4] ............................................. B62R 19/06
[52] U.S. Cl. ................................. 280/281.1; 403/295; 403/246; 403/334
[58] Field of Search ............ 280/281 R; 403/295, 403/246, 334, 235, 245

[56] References Cited

U.S. PATENT DOCUMENTS

| | | | |
|---|---|---|---|
| 714,571 | 11/1902 | Freed | 280/281 R |
| 2,080,698 | 5/1937 | Clark | 280/281 R |
| 4,479,662 | 10/1984 | Defoor et al. | 280/281 R |

FOREIGN PATENT DOCUMENTS 51-54365 12/1976 Japan .

Primary Examiner—Charles A. Marmor
Assistant Examiner—Donn McGiehan
Attorney, Agent, or Firm—Stevens, Davis, Miller & Mosher

[57] ABSTRACT

The present invention is an improved construction for joining chainstays with a bottom bracket shell in a bicycle frame. The construction consists of a pair of taper-shaped projecting parts of a bottom bracket shell, inserting portions of chainstays placed around the projecting parts and a connecting ring provided with a pair of taper-shaped connecting holes. The connecting ring is placed around the joining part of the bottom bracket shell and chainstays and joins the bottom bracket shell and chainstays together by the bonding strength of an adhesive agent and a screw from the connecting ring to the bottom bracket shell. The adhesive agent is uniformly spread between the bottom bracket shell and chainstays and should the adhesive agent become ineffective, the chainstays will not loosen from the bottom bracket shell due to the screw.

2 Claims, 2 Drawing Sheets

CONSTRUCTION OF A BICYCLE FRAME FOR JOINING CHAINSTAYS WITH A BOTTOM BRACKET SHELL

BACKGROUND OF THE INVENTION

Heretofore, in joining chainstays with a bottom bracket shell on a bicycle frame the bottom bracket shell and chainstays were joined together only by adhesive agents However, the bicycle frame as above-mentioned has a weakness in that the adhesive strength weakens due to the bicycle frame being under constant stress and strain from every direction. The Japanese Utility Model Application Publication No. Sho 51-54365 is cited as a prior art to solve the problem of the bicycle frame. The prior art comprises a bottom bracket shell defining a pair of cylindrical projecting parts with chainstays around the cylindrical projecting parts bonded thereto, an inner frame between the joining parts of the cylindrical projecting parts and chainstays and a rivet through the inner frame, chainstays and cylindrical projecting parts.

The prior art has the advantage in that the joining construction of the chainstays and bottom bracket shell doesn't loosen when the adhesive agent becomes ineffective.

However, in the joining construction, it is hard to uniformly spread adhesive agent between the cylindrical projecting parts and chainstays.

In addition, it was experimentally discovered that the joining strength of the rivet through the chainstays and cylindrical projecting parts is not enough to compensate for the stress and strain from every direction.

SUMMARY OF THE INVENTION

The present invention is directed to a construction for joining chainstays to a bottom bracket shell which provides a strong construction through adhesive strength and screw-tightening strength.

The construction comprises a bottom bracket shell, two chainstays with tapered ends, a connecting ring and a screw. The bottom bracket shell defines a pair of taper-shaped projecting parts on its outer circumference and a screw hole positioned between said taper-shaped projecting parts.

On the end of each of the chainstays is a taper-shaped inserting portion for positioning around each of said projecting parts of the bottom bracket shell and adhesively bonded thereto.

The connecting ring defines a pair of taper-shaped connecting holes placed around said taper-shaped inserting portion and bonded thereto. The connecting ring has a screw hole positioned between said connecting holes in alignment with the screw hole of the bottom bracket shell.

A screw through the screw holes of the connecting ring and bottom bracket shell forces the ring and shell together.

The taper-shaped connecting holes of the connecting ring press together the taper-shaped joining parts of the bottom bracket shell and chainstays with the adhesive agent bonding both. The adhesive agent uniformly is spread in a thin layer.

Consequently, the projecting parts of the bottom bracket shell and the inserting portions of the chainstays are securely bonded in one body.

The bottom bracket shell and the connecting ring, connected by a screw through their respective screw holes do not become loose even if the adhesive agent becomes ineffective.

The unitary connecting ring may be replaced by a pair of ring units, each of which is separately put around each of the inserting portions of the chainstays with a connecting ring stopper combining the ring units. This embodiment has the advantage of the worker easily separately putting each of the ring units around each of the inserting portions of the chainstays.

Other details and features of the invention will stand out from the description given below by way of non-limitative example and with reference to the accompanying drawings, in which:

DESCRIPTION OF THE PREFERRED EMBODIMENT

Figure 1:
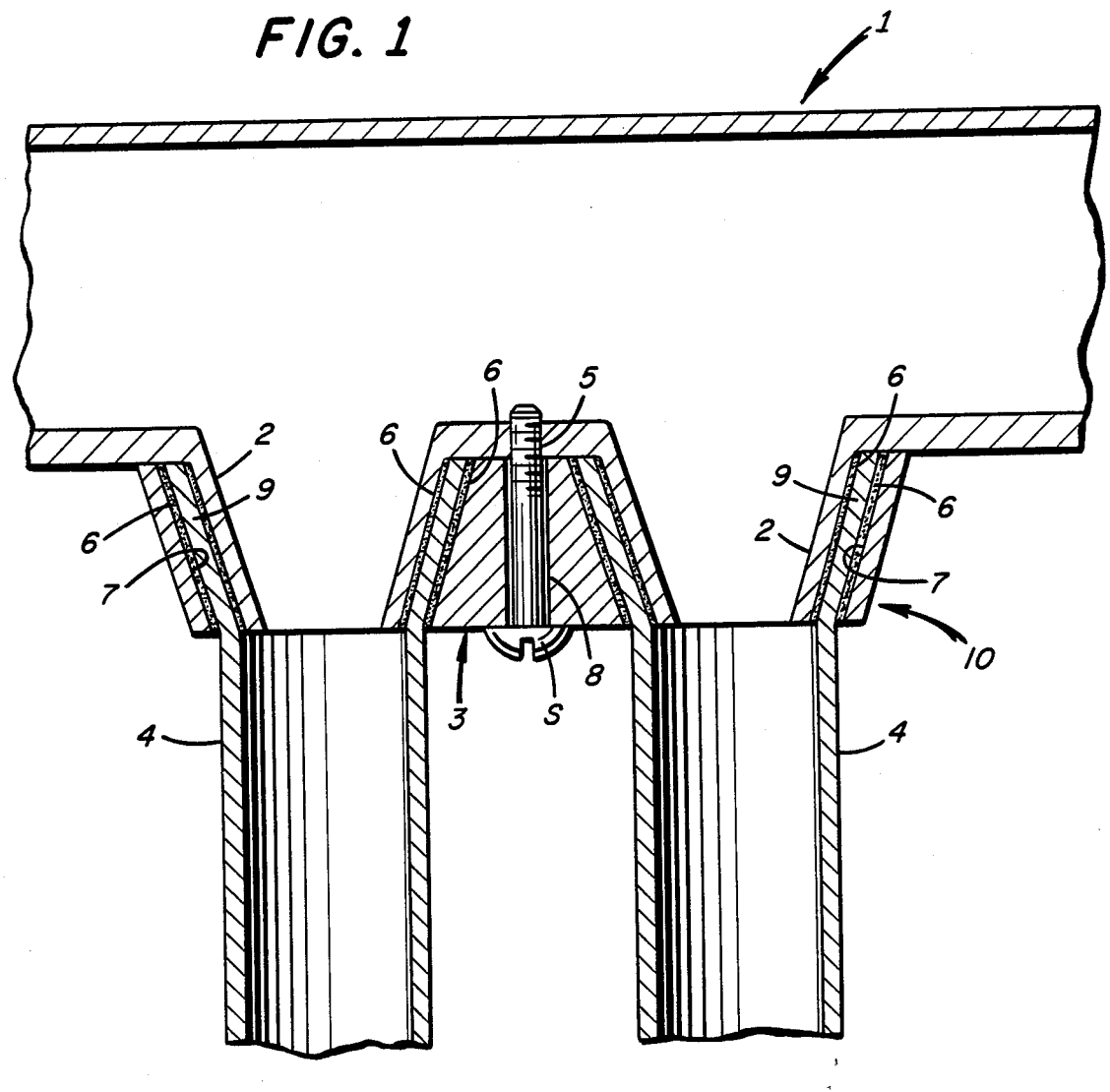
FIG. 1 is a horizontal sectional view of a first embodiment of the invention for joining chainstays with a bottom bracket shell.
Figure 2:
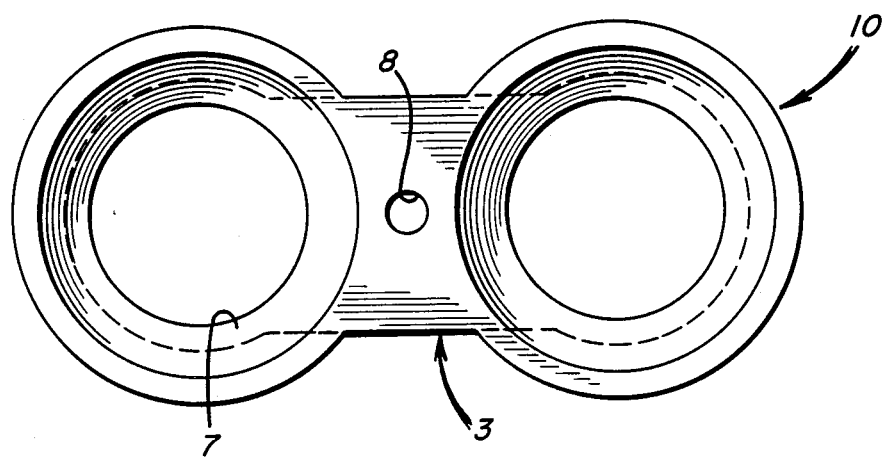
FIG. 2 is a front elevational view of the connecting ring of FIG. 1 looking from top to bottom in FIG. 1.

Referring to FIGS. 1 and 2 there is shown a bottom bracket shell 1, composed of a pair of projecting parts 2 and a screw hole 5 positioned between said projecting parts 2.

A connecting ring 3 defines a pair of connecting holes 7 and a screw hole 8 positioned between said connecting holes 7.

The connecting holes 7 are taper-shaped and positioned over the projecting parts 2 of the bottom bracket shell 1 and ends 9 of chainstays 4. The screw hole 8 aligns with the screw hole 5 of the bottom bracket shell 1.

A pair of chainstays 4 each define a taper-shaped inserting portion 9 at one end thereof. The tapered ends 9 of chainstays 4 fit over the projecting parts of bottom shell bracket 1.

To assemble the unit, adhesive agent 6 is placed on the outer circumference of each of the projecting parts 2 and then the tapered portions 9 of the chainstays 4 are placed around each of the projecting parts 2. The connecting ring 3 is then moved along the outer circumference of the chainstays 4.

An adhesive agent is then spread on each of the outer circumferences of the tapered portions 9, and the connecting ring 3 seated around each of the tapered portions 9.

As the connecting ring 3 is pressed on the taper-shaped inserting portions 9, the adhesive agent 6 is uniformly spread around the connecting holes 7 and taper-shaped inserting portions 9.

A screw is then screwed through the screw hole 8 of the connecting ring 3 and the screw hole 5 of the bottom bracket shell 1, thus connecting ring 3 with bottom bracket shell 1 and chainstays 4.

The construction of the present invention has the advantage that the worker easily joins the chainstays 4 to the bottom bracket shell 1 thereby making the adhesive agent 6 more effective.

If and when the adhesive agent becomes ineffective the chainstays 4 are not loosened.

Figure 3:
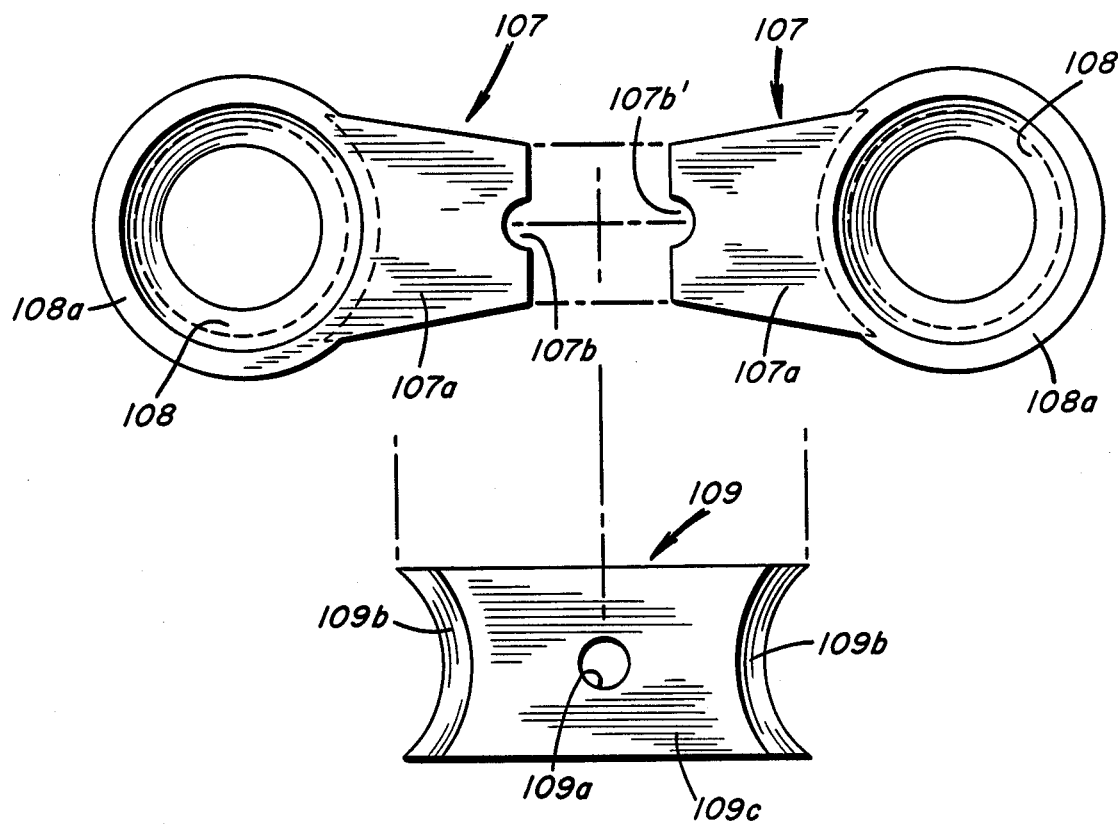
FIG. 3 is a front elevational view of a second embodiment of the invention showing ring units and a connecting ring stopper.
Figure 4:
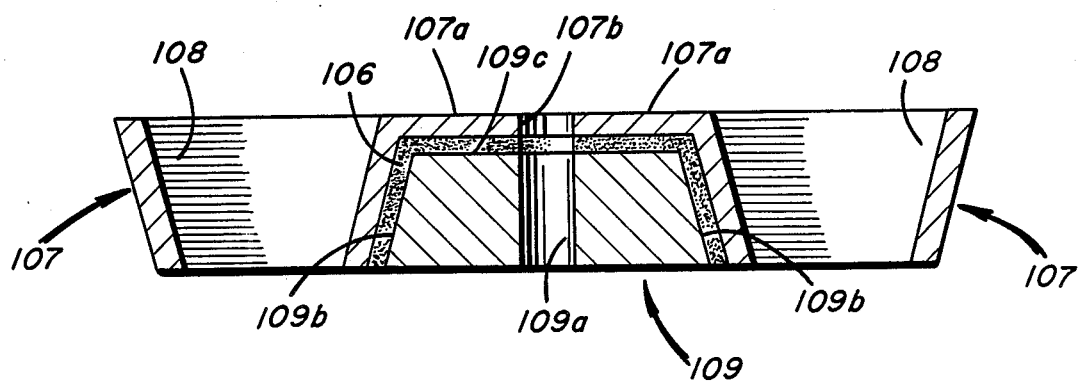
FIG. 4 is a horizontal sectional view of the second embodiment showing a connecting ring consisting of a pair of ring units and the connecting ring stopper.

In the second embodiment shown in FIGS. 3 and 4, connecting ring 3 of the first embodiment is separated into a pair of ring units 107.

Each ring unit 107 defines a tapered body 108a having a hole 108 therethrough and a plate-shaped projecting part 107a extending from the body 108a. The plate-shaped projecting part 107a defines a half-circle shaped recess 107b in one end thereof.

A connecting ring stopper 109 is positioned over the assembled ring units 107. The connecting ring stopper 109 defines side faces 109b, a front face 109c and a screw hole 109a positioned in alignment with screw hole 107b composed of recesses 107b.

In assembling the unit, adhesive agent 6 is spread on the outer circumference of each of the projeciing parts 2 and then, each of the taper-shaped inserting portions 9 of the chainstays 4 is placed around each of the projecting portion 2. Ring units 107 are movably placed along the outer circumference of the chainstays 4.

Adhesive agent 6 is spread on the outer circumference of each of the taper-shaped inserting portions 9 and then each of the ring units 107 is positioned around one of the taper-shaped inserting portions 9 of chainstays 4.

When the pair of ring units 107 is positioned each of the ends of the plate-shaped projecting parts 107a of the ring units 107 face each other, so that said half circle recesses 107b form a screw hole 107b.

Adhesive agent 106 or 6 is spread then on the front face 109c and side faces 109b of the connecting ring stopper 109, and connecting ring stopper 109 is pressed against bodies 108a and the plate-shaped projecting parts 107a.

The ring units 107 and the connecting ring stopper 109 are bonded by the adhesive agent 6, 106.

A screw is then screwed through the screw hole 109a of the connecting ring stopper 109, the screw hole 107b of the ring unit 107 and the screw hole 5 of the bottom bracket shell 1, so the bottom bracket shell 1 and chainstays 4 are securely combined.

What is Claimed:

1. An assembly of a bicycle frame for joining chainstays with a bottom bracket shell comprising:
    (a) a bottom bracket shell defining, a pair of projecting parts and a screw hole in said shell positioned between said projecting parts;
    (b) a pair of chainstays each defining, a taper-shaped inserting portion at one end of each, said taper-shaped inserting portion being positioned over each of the projection parts of the bottom bracket shell and bonded thereto;
    (c) a connecting ring defining, a pair of taper-shaped connecting holes and a screw hole therebetween, each of said taper-shaped connecting holes being positioned around each of the inserting portions of the chainstays, said screw hole positioned between the taper-shaped connecting holes being aligned with the screw hole of the bottom bracket shell; and
    (d) a screw through said screw holes of the bottom bracket shell and connecting ring to hold said bottom bracket shell and connecting ring together.

2. The assembly of a bicycle frame as in claim 1, wherein said connecting ring comprises:
    a) a pair of ring units, each of said ring units comprising a body providing a connecting hole for insertion around a chainstay, and a plate-shaped projecting part projecting from the body and forming a half-circle shaped recess in an end thereof, each of said half-circle shaped recesses of the ring unit facing each other to form a screw hole when mounted on a chainstay;
    b) a connecting ring stopper, defining a screw hole, alignable with the screw hole formed from the half-circle shaped recess and the screw hole in the bottom bracket shell, positioned over the plate-shaped projecting parts of the ring units and bonded thereto; and
    c) a screw seated in the screw hole of the connecting ring stopper, the screw hole of the bottom bracket shell and the screw hole formed by said half-circle shaped recesses to hold said bottom bracket shell and said chainstays together.

* * * * *